United States Patent [19]

Famos et al.

[11] 4,154,129
[45] May 15, 1979

[54] METHOD AND APPARATUS FOR SHEARING BILLETS WITH HYDRAULIC SHEARS IN CONTINUOUS CASTING PLANT

[75] Inventors: Steno Famos, Ronchi dei Legionari; Fulvio Fasano, Gorizia; Alfredo Bassarutti, Terenzano, all of Italy

[73] Assignee: Officine Meccaniche Danieli & C. SpA, Udine, Italy

[21] Appl. No.: 648,720

[22] Filed: Jan. 13, 1976

[30] Foreign Application Priority Data

Jan. 13, 1975 [IT] Italy .................. 83303 A/75

[51] Int. Cl.² .................. B23D 25/04; B26D 1/56
[52] U.S. Cl. .................. 83/308; 83/37; 83/320
[58] Field of Search .................. 83/308, 318, 319, 320, 83/37

[56] References Cited

U.S. PATENT DOCUMENTS

| | | | |
|---|---|---|---|
| 3,224,310 | 12/1965 | Bieri | 83/308 |
| 3,442,167 | 5/1969 | Ohmasu | 83/308 |
| 3,717,058 | 2/1973 | Meminn | 83/320 |

*Primary Examiner*—Donald R. Schran
*Attorney, Agent, or Firm*—A. W. Breiner

[57] ABSTRACT

A process and apparatus for the continuous shearing of billets or bars of various shapes and sizes produced in a continuous casting plant wherein the shearing device moves in harmony with the billets is described. According to the process and as permitted by the apparatus, a first blade preferably the upper blade is caused to approach a billet and rest on it by means of hydraulic pressure working on cylinder/piston means, and thereafter a second blade positioned opposite the first blade is caused to move from supporting brackets to approach the billet and thereafter the blade caused to continue its course and cut into and shear the billet with the shears being supported substantially only by the billet during the shearing process. The device is relatively simple in design and is highly efficient.

10 Claims, 3 Drawing Figures

METHOD AND APPARATUS FOR SHEARING BILLETS WITH HYDRAULIC SHEARS IN CONTINUOUS CASTING PLANT

The present invention is directed to a process and to an apparatus for shearing billets or bars of various shapes produced in continuous casting plants without the need to halt or slow down the movement of the billets or bars. More particularly, it relates to a process and apparatus for shearing billets with hydraulic shears whereby the shearing of the billet is carried out at right angles to the billet and preferentially upwards from below. The billet is gripped in the manner of a vice between one blade, which is usually the upper blade of the shears, and the lower blade, which is able to move within said blade-carrying structure, the whole being carried out without slowing down the movement of the billet in the casting plant.

The use of billet shearing procedures is known wherein shears are used that rest on slide guides and are moved by hydraulic means. Although such processes cause the billet to be sheared after it has been gripped between two blades of the shears in the manner of a vice, various difficulties are still encountered, precluding complete acceptance. One difficulty occurs in that in the known shearing devices there is a piston for each blade, with the result that it is necessary to have pipes or conduits for delivery of oil into the upper part of the shears as well as into the lower part of the shears. Another difficulty occurs in that it is necessary in the known shearing devices to grip the billet between the upper blade and the bench supporting the billet with a force not commensurate with the shearing force. A further difficulty with prior devices is that a double hydraulic circuit is needed, there being one circuit for each blade, with consequent problems in obtaining a good seal and the relative adjustment of the pressure for driving the blades. Yet another difficulty is that the shearing action is not gradual.

The present invention, therefore, has as a primary object providing a process and apparatus for shearing with hydraulic shears whereby the force or pressure exerted by the upper blade on the billet being sheared is commensurate with the shearing force required.

Another object is to provide an apparatus wherein there is only one cylinder/piston system to activate the blades of the hydraulic shears, thereby reducing the consequent problems of breakdowns, seals, drives, and adjustments; and whereby less installed power is needed, eliminating waste of energy in bringing about the movement of the blades.

The invention provides, therefore, the advantage of having one hydraulic circuit or system to drive a single cylinder/piston means, the circuit being preferably located in the lower part of the carrying frame or structure. The cylinder and the piston are preferably connected rigidly to one or the other of the blades, one blade being connected to the cylinder and the other to the piston. The apparatus of the invention eliminates the difficulty associated with having piping in the upper part of the shears and, more important, the problem of adjusting the force of each blade, the adjustment of force being both a quantitative and a timing adjustment. A further advantage is the lower consumption of energy since there is only one hydraulic system and that system makes use of the force of gravity.

Still another advantage of the present process and apparatus lies in the fact that the reaction to the shearing force is not discharged through sliding wheels, or the like, onto slide guides, or the like, of the support for the shears, and this fact permits a reduction in the pulling power required since friction between such wheels and guides is governed only by the fact that the wheels are subjected only to the force of gravity of the system. That is to say, the force of traction is substantially independent from the position of the shear blades and from the temporary stress to which the blades of the shears are subjected inasmuch as the shearing force of the lower blade is at all times balanced by the force of the pressure of the upper blade.

The stated objectives and advantages together with further objectives and advantages which will be shown during the course of the description are obtained with a process and apparatus for shearing billets or bars of various shapes and sizes, preferably being billets or bars produced in continuous casting plants whereby the shearing device moves in harmony with the billet or bar, said process being characterized by the fact that a first blade, preferably the upper one, is brought close to the billet by hydraulic pressure acting on cylinder/piston means and is caused to rest thereon and that the second blade, located opposite to said first blade, then moves from supporting brackets and approaches said billet and, continuing its course, cuts into and shears the billet, said shears being supported substantially by the billet during the shearing phase.

The above process is carried out with hydraulic shear apparatus including a support running longitudinally on guides, a system or means for the longitudinal movement of said support, an upper and a lower blade which are able to move towards each other along a substantially longitudinal shearing line, and one or more frames provided with axial longitudinal guide means, said apparatus being characterized by the fact that it includes in reciprocal combination and coordination— a first longitudinal movable frame that carries a first blade;

a second longitudinal movable blade-carrying frame, to which is anchored the second blade, which is located opposite to said first blade;

support means present in one or the other of said first or second frames and cooperating with and resting on supporting brackets located in the running support;

longitudinal guide means cooperating with at least one of said first or second frames and with said running support;

axial guide means reciprocally present and mutually cooperating in said first and second frames;

cylinder and piston means which cooperate in a coordinated manner with one of said first and second frames, whereby said first and second frames are supported by the billet during the shearing phase and the mutual positions of the blades, when at rest, can be adjusted, it being possible to adjust vertically at least one blade in respect of its normal position of rest.

A preferable embodiment of the device which adopts the disclosed process or procedure for non-limitative, exemplificative purposes, with a view to showing more clearly the special features of the shearing process and the device and to illustrate further new useful features will be described with reference to the attached drawings wherein—

FIG. 1 gives a side view of a section of one embodiment of the invention;

In the figures the same parts or parts performing the same functions have been given the same reference numbers.

Figure 1:
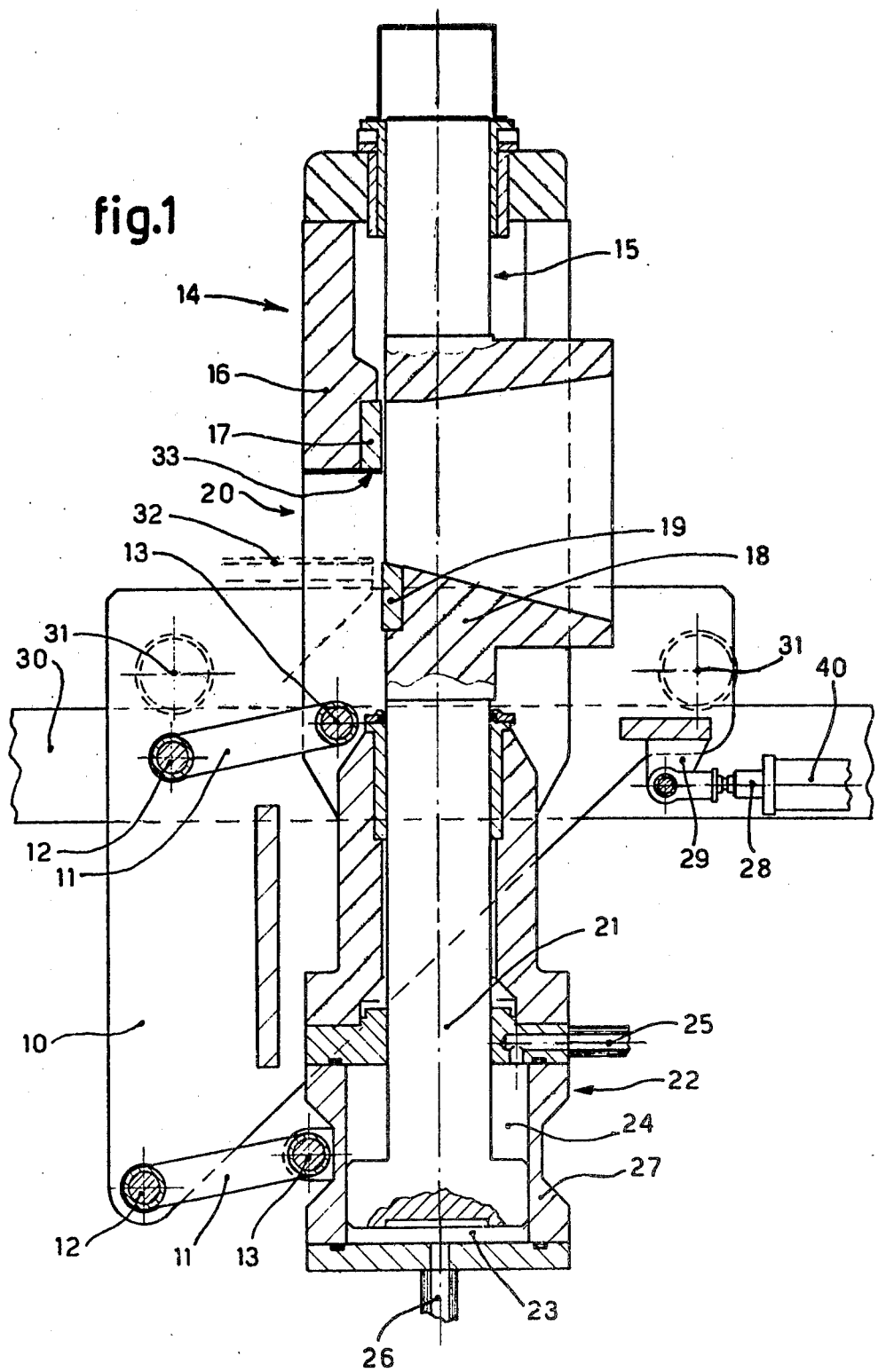
Figure 2:
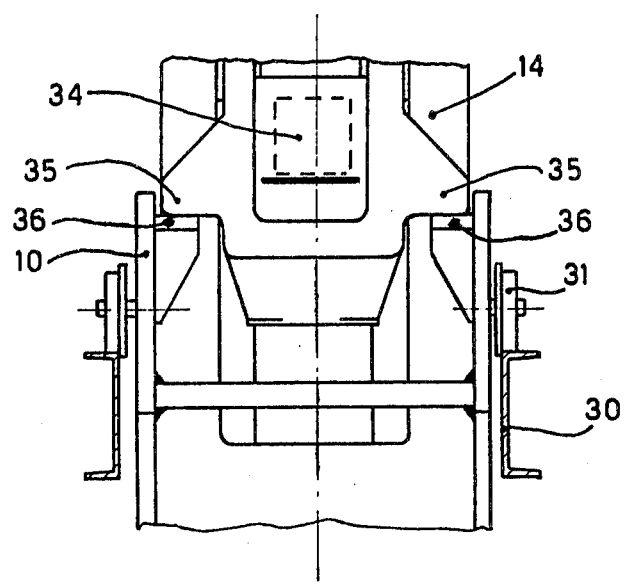
FIG. 2 is a front view of said embodiment.

With reference to the drawing, 10 is a laterally movable support. Elements 11 are levers which anchor frame 14 to support 10 and act in the form of a parallelogram. Elements 12 are pivots which fasten levers 11 to said support 10. Elements 13 are pivots which fasten levers 11 to frame 14. 14 is generally the first blade-carrying frame or structure of the cutting device or shears. 15 is generally the second blade-carrying frame. More specifically, element 16 is the upper blade carrier and is secured to the first frame 14 and has upper blade 17 attached to it. Blade 17 is the upper or unmoving blade and has its surface 33 at right angles or almost at right angles to the axis of movement of the blade 17. 18 is the central part of the second blade-carrying frame 15 and, in the example shown, has an outlet passage shaped like a reversed funnel. 19 is the lower blade. 20 is the passage for the billet and has a variable size so that the distance which the upper blade 17 has to travel to approach the upper surface of the billet can be reduced, the cutting edge of the lower blade 19 during its rest phase being very close to the lower surface of the billet. 22 is generally the cylinder/piston means which activates the blades, the piston being referenced with numeral 21 and the cylinder with numeral 27. In the example shown, the cylinder 27 is integrally fixed to the first blade-carrying frame 14, while the piston 21 is integrally fixed to the second blade-carrying frame 15. Accordingly, first and second frames 14 and 15 move parallel to each other and, in our example, along the same axis. 23 is the lower chamber, whose free length during the phase of rest of the shears depends on the thickness of the billet. 24 is the upper chamber or area of travel of the piston 21. 25 is the pipe or conduit for filling or emptying the upper chamber 24. 26 is the pipe or conduit for filling or emptying the lower chamber 23. 28 is the piston and serves to provide the desired longitudinal conditioning to the support 10 during the shearing phase. 29 is a lug for connecting said piston 28 to the support 10. Elements 30 are generally the guides on which support 10 runs on wheels 31. 32 is the supporting bench for the billet 34 arriving from a roller delivery bench 31. Supporting bench 32 is anchored to the support 10 and serves to sustain the billet or bar 34 when the latter is soft owing to its temperature or has dimensions such as not to be able to sustain the shears. 34 is a billet or bar having any desired section. Elements 35 are the lugs to support the second blade-carrying frame 15 whereby said frame 15 rests on the support 10. Consequently, during the rest phase the first frame 14 also comes to rest on the support 10 by means of the cylinder/piston means 22. Elements 36 are the supporting brackets on support 10 for sustaining lugs 35. 37 are generally the intake and offtake roller stands on which the billet 34 runs. 38 is a crop end sheared from said bar 34. 39 is the pit wherein the shears run. 40 is generally the hydraulic system for longitudinal activation of the shears and contains piston 28.

Figure 3:
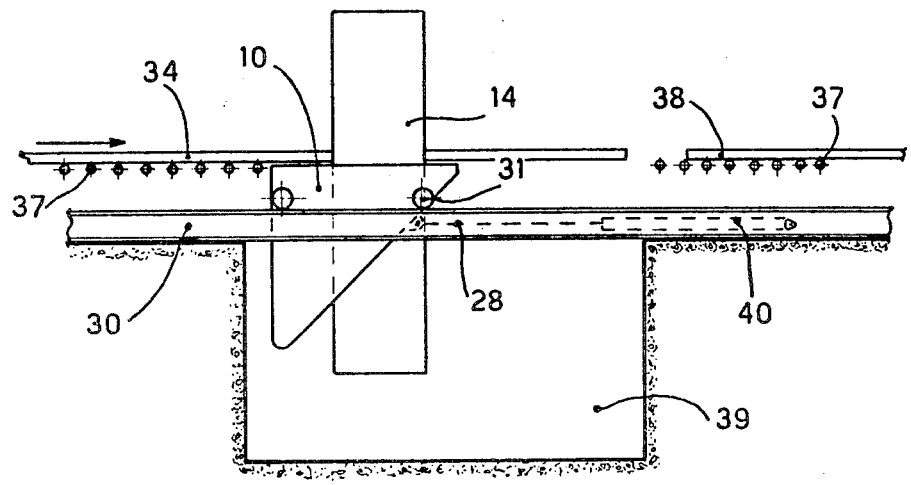
FIG. 3 is a side view of said embodiment during its working phase.

As can be seen from FIG. 3 in the functioning of the apparatus, billet 34, moving on the roller stand 37, enters the passage 20 of the shears. This billet moves forward and is sheared by the shears, which are moving at substantially the same speed as the billet, which in the example shown is moving towards the right. During the phase of rest of the shears, the free vertical section of the passage 20 is adjusted by moving to a desired position a means for detecting reciprocal positioning. This detector means is of a known type, such as a microcontact and a valve or another device, for example, and, during the return phase of the elements of the shears after shearing has taken place, halts said first and second frames 14 and 15 in the desired temporary position. The temporary position is usually such that the surface 33 is very close to the upper surface of the billet 34 while the cutting edge of the blade 19 is, during its rest phase, always positioned close to the lower surface of the billet 34 owing to the temporary position of the elements 19 (blade), 35 (sustaining lug), 36 (bracket), and 32 (bench).

The drive for shearing and bringing the blades together is obtained by delivering oil into the pipe 26 connected to the chamber 23 and, at the same time, making oil flow out of the chamber or travel area 24. By entering the chamber 23 the oil determines a related movement of the piston 21 and of the cylinder 27, which is secured to the frame 14. This related movement determines a lowering of the frame 14, said lowering being assisted by the force of gravity of the frame 14 itself, while the piston 21, as said above, is suspended by means of the lugs 35 of the part 18 connected to the piston, the lugs resting on the brackets 36 of the support 10.

Lowering of the frame 14 and, thus, of the element 16 takes place until the surface 33 comes to rest on the billet 34. When bench 32 is provided, the billet is gripped as if in a vice whose jaws are respectively the element 16, the blade 17, and the bench 32. When the blade 17 rests on the billet 34 and clamps it, the hydraulic pulling system 40 starts functioning and quickly brings the shears to a speed close to or substantially equal to the speed of the billet. By resting on the billet 34, the element 16 prevents a further descent of the frame 14. Therefore, since the related movement of the piston 21 and cylinder 27 continues with the continued delivery of oil into the chamber 23, the piston 21 now starts to move and displaces during its movement the part 18 and thereby the blade 19 rigidly connected thereto. The blade 19, which is situated with its upper extremity slightly below the upper surface of the bench 32 and, thus, close to the lower surface of the billet 34, moves forward and cuts into said billet with a shearing force that increases with the depth of the cut. This determines, as a reaction, an increase in the pressure applied by the element 16 on the billet 34. This continuous balance between the force of pressure applied to the billet by the element 16 and the shearing force applied by the blade 19 has the effect that only the weight of the shears presses on the guides 30 when the bench 32 is in position. If, however, the bench 32 or some other similar support is not provided, the shears will be sustained by the billet itself. These two conditions have the result that in any case the tractive force is, under the worst conditions, nearly the same or equal to that required to move the support 10 together with the shears in their condition of rest. This condition is brought about because when the second frame 15 begins moving upwards, i.e., the blade 19 begins moving towards the billet 34, the sustaining lugs 35 leave their support, which consists of the brackets 36. The result is that the whole shears are then supported by the surface 33 resting on the upper face of the billet 34. When the shears rest on and are supported by the surface 33, they are guided vertically by guide means which in the example shown consist of the parallelogram 11. In the instance shown, said guide means guide the first frame 14 at all times during its vertical movements.

When the billet 34 has been cut, the piston 21 is located substantially at the end of its travel. As shown above, its travel can be adjusted in coordination with the thickness of the billet 34. The flow of oil is then reversed. That is to say, the chamber 24 is fed through pipe 25 and oil is made to flow from the chamber 23 through the pipe 26. The piston 21 descends until the lugs 35 of the body 18 are again resting on the brackets 36 of the support 10. At this point the frame 14 begins to move upwards until it reaches its temporary position of rest. After the frame 14 has risen, the hydraulic system 40 reverses its movement and again brings the shears to the extreme left position in the pit 39. The shearing of the billet to the desired size and therefore the length of the bars 38 can be obtained by providing shearing drive to the blades of the shears in their position at the extreme left of the pit by means of a positioning means which the free end of the billet engages.

A preferred example has been described. However, variants thereto are possible without thereby departing from the scope of the inventive concept. It is possible to vary the proportions and sizes of the various parts without disturbing their functions. It is possible to replace the parallelogram-type system of levers with another system of levers while at the same time keeping or changing the layout of the blade-carrying frame or structure. It is also possible to replace the system of levers with a system of vertical guides, which could, as an example, consist of a combination of sliding means and grooves positioned internally or externally. It is also possible to provide for the supporting lugs 35 to belong to any of the parts of the cylinder or movable blade. It is also possible to invert the connection of the first or second frame to the cylinder or piston. It is also possible to position the cylinder/piston means above or on the side instead of below. It is also possible to modify the reciprocal guide system of the first and second frames with another vertical guide system which could make the support 10 cooperate direct with one or the other frame in such a way that the vertical axes of said two frames would become parallel to each other. It is possible to make the shears operate in a horizontal, almost horizontal, or almost vertical manner. It is also possible that the vertical axes of movement of the first and second frame should coincide, be parallel, be at an angle to each other, or be askew. All these modifications and variants and others are contained within the scope of the presently disclosed inventive concept.

It is claimed:

1. Hydraulic shears for shearing billets of various shapes and sizes, including a support running longitudinally on guides, means for moving said support longitudinally, and an upper blade and a lower blade of which one is able to move towards the other along a substantially longitudinal shearing line, said shears being characterized in that— a first longitudinally movable frame which carries a first of said blades;

a second longitudinally movable frame which carries a second of said blades, positioned opposite to said first blade;

supporting means present in one of said first and second frames and resting on and cooperating with sustaining brackets present in said running support;

guide means cooperating with at least one of said first and second frames and with said running support for guiding said frame;

vertical guide means for said at least one of said frames reciprocally guiding and cooperating with said other of said frames; and cylinder and piston means, each of said cylinder and piston cooperating in a coordinated manner with one of said first and second frames, wherein while shearing the billet said first and second frames are sustained by the billet running in said frames and during a rest phase the reciprocal position of the blades can be adjusted, at least one blade being able to be adjusted vertically for the normal position of rest.

2. Hydraulic shears for shearing billets of claim 1 wherein the axis of vertical movement of said first frame coincides substantially with the axis of vertical movement of said second frame.

3. Hydraulic shears for shearing billets of claim 1 wherein the axis of vertical movement of said first frame is parallel to the axis of vertical movement of said second frame.

4. Hydraulic shears for shearing billets of claim 1 wherein the shears have their longitudinal axis positioned vertically.

5. Hydraulic shears for shearing billets of claim 1 wherein the distance between said blades when at rest can be adjusted, wherein the position of one of said blades when at rest is always close to one lateral surface of a pathway of a billet and the said close position is substantially always the same.

6. Hydraulic shears for shearing billets of claim 1 wherein a supporting bench to sustain a billet is positioned on said running support.

7. Hydraulic shears for shearing billets of claim 1 wherein the longitudinal axis of said shears is positioned vertically, and said first blade with its face close to a billet pathway is placed above said billet pathway and said second frame carrying said second blade rests, when in its position of rest, by means of supporting lug means, on brackets integrally fixed to said running structure.

8. Hydraulic shears for shearing billets of claim 1 wherein the cylinder/piston means is positioned at one longitudinal end of said shears.

9. Hydraulic shears for shearing billets of various shapes and sizes, including a support running longitudinally on guides, means for moving said support longitudinally, and an upper blade and a lower blade of which one is able to move towards the other along a substantially longitudinal shearing line, said shears being characterized in that— a first longitudinally movable frame which carries a first of said blades;

a second longitudinally movable frame which carries a second of said blades, positioned opposite to said first blade;

supporting means present in one of said first and second frames and resting on and cooperating with sustaining brackets present in said running support;

guide means cooperating with at least one of said first and second frames and with said running support for guiding said frame;

vertical guide means for said at least one of said frames reciprocally guiding and cooperating with said other of said frames; and cylinder and piston means, each of said cylinder and piston cooperating in a coordinated manner with one of said first and second frames, wherein while shearing the billet said first and second frames are sustained by a billet running in said frames and during a rest phase the reciprocal position of the blades can be adjusted, at least one blade being able to be adjusted vertically for the normal position of rest and at least one of the first and second frames being guided longitudinally by guide means which cooperate with said running support and said guide means consist of a parallelogram wherein levers on said parallelogram are anchored in a swinging manner at one end to said running support and at the other end to said one frame which is guided longitudinally by said guide means.

10. Hydraulic shears for shearing billets of claim 9 wherein the second frame is guided longitudinally by said guide means which cooperate with the first frame.

* * * * *